Figure 1:
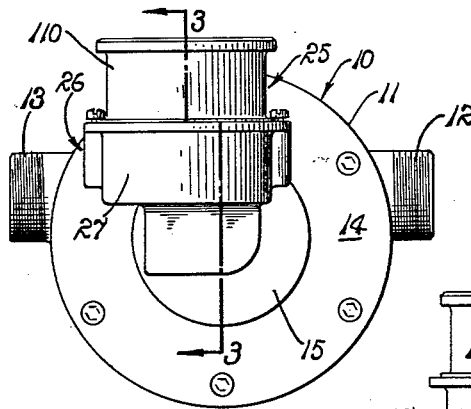

July 31, 1962 L. W. BILLS 3,046,783

FLUID SEALING SYSTEM

Filed May 18, 1959 2 Sheets-Sheet 1

LLOYD W. BILLS
INVENTOR

HUEBNER & WORREL
ATTORNEYS

BY Richard M. Worrel

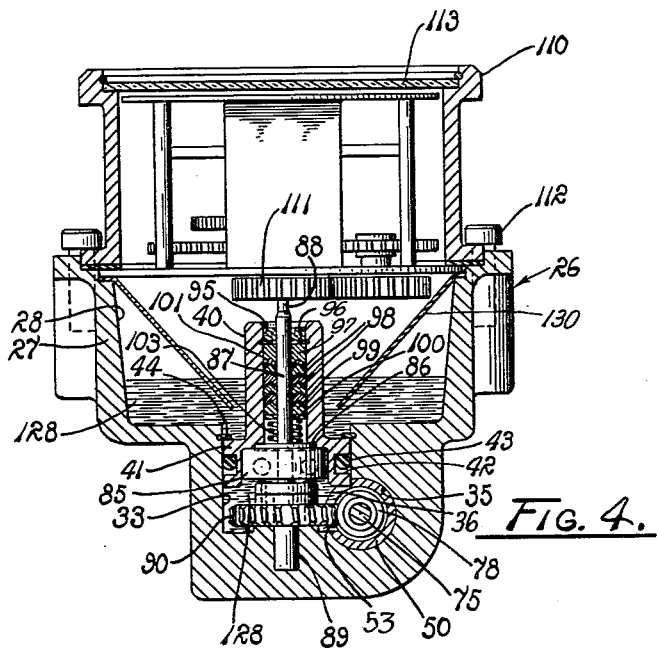

3,046,783
FLUID SEALING SYSTEM
Lloyd W. Bills, Downey, Calif., assignor to Flow Equipment Co., Inc., Santa Fe Springs, Calif., a corporation of California
Filed May 18, 1959, Ser. No. 813,959
15 Claims. (Cl. 73—272)

The present invention relates to a fluid sealing system and more particularly to a barrier for fluids characterized by high penetrability and which barrier utilizes as a part thereof a fluid of lower penetrating ability.

While pumping oil from an oil well, it is desirable continuously and accurately to meter the quantity of oil being pumped. For this purpose, it is conventional to connect a fluid flow meter in the main flow line and to connect a register to the meter. Normally the meter has a drive shaft which is rotated incident to passage of fluid therethrough while the register has a driven shaft which is coupled to the drive shaft of the meter. These shafts are surrounded by a conduit or housing in which the shafts are journaled. Proper operation requires the register to be isolated from the fluid being metered but unfortunately such isolation has been extremely difficult to accomplish for reasons which will readily be understood when it is noted that the fluid being metered may be under a pressure of the magnitude of five thousand pounds per square inch while the register is at atmospheric pressure.

The problem is further aggravated by the frequent presence of salt water in such oil being metered. While certain conventional seals are found to be relatively effective against oil, they have been entirely unsatisfactory as barriers to salt water. Thus the problem of blocking salt water, accompanying a stream of oil being metered, from the register at several hundred pounds lower pressure per square inch than the stream, typifies an operational environment convenient to the description of the present invention. It will, of course, be appreciated that the invention is not limited to such specific utilization.

Accordingly, it is an object of the present invention to provide an improved fluid sealing system.

Another object is to provide a system for isolating a fluid seal from fluids of certain predetermined characteristics normally having an adverse effect on the seal while subjecting the seal only to fluids which the seal is capable of withstanding under high pressure and without leakage.

Another object is to utilize differences in molecular size of fluids to achieve a seal by employing a fluid characterized by large molecular structure to aid a mechanical seal in acting as a barrier against a fluid of smaller molecular structure.

Another object is to equalize the pressure on opposite sides of a bearing or piston subjected to fluid of predetermined characteristics whereby such fluid is prevented from leaking past the bearing.

Another object is to provide a fluid seal for use in withstanding fluids of predetermined characteristics under exceedingly high pressures.

Another object is to protect and isolate a fluid flow register from fluids passing through a meter with which the register is operable and particularly from salt water, and other impurities, in the primary fluid passing through the meter.

Another object is to improve the accuracy and operation of a fluid flow meter and associated register.

Other objects are to provide a fluid isolating system for use with a flow meter and associated register which is simple to construct and maintain, economical, dependable in action, and highly effective for accomplishing its intended purposes.

These, together with other objects, will become more fully apparent upon reference to the following description and accompanying drawings.

Figure 2:
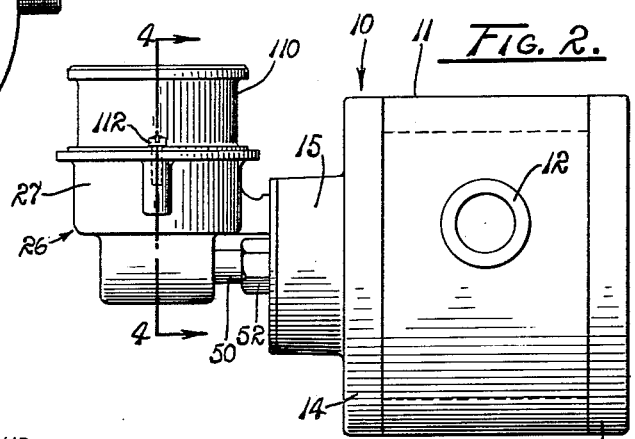
Figure 3:
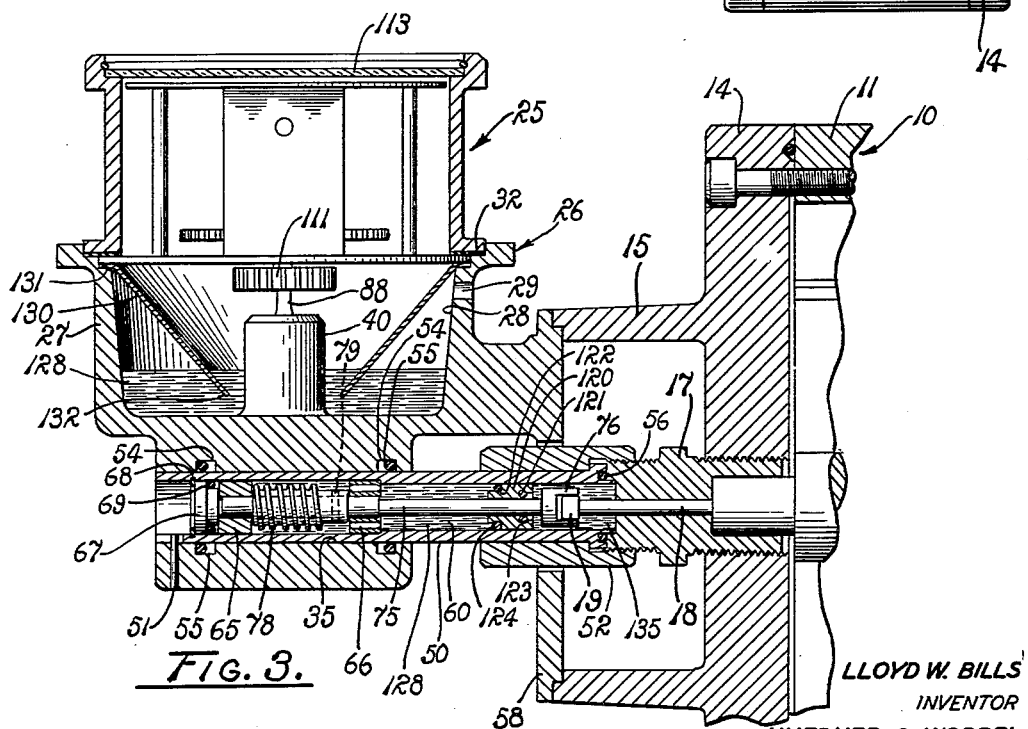

In the drawings:
FIG. 1 is a side elevation of a fluid flow meter and associated register which incorporates a fluid sealing system embodying the principles of the present invention.
FIG. 2 is an end elevation of the structure illustrated in FIG. 1 viewed from a position at the right of FIG. 1.
FIG. 3 is a somewhat enlarged fragmentary vertical section taken on line 3—3 of FIG. 1.
FIG. 4 is a somewhat enlarged vertical transverse section taken on line 4—4 of FIG. 2.

Referring more particularly to the drawings, a fluid flow meter of the type shown and described in Patent No. 2,738,775 is generally indicated by the numeral 10. This meter includes a cylindrical housing 11 having axially aligned inlet and outlet ports 12 and 13, respectively, and adapted for connection in a fluid flow line, not shown, whereby fluid under pressure is passed through the meter. The housing also provides opposite end walls 14, and an annular lateral extension 15 is extended from one of the end walls in coaxial relation with the housing. A bushing 17 is coaxially screw-threadably fitted in the end wall from which the extension protrudes and rotatably journals a drive shaft 18 which is rotated incident to passage of fluid through the meter. The drive shaft has a male coupling 19 extended endwardly from the bushing.

A register adapted for association with the flow meter 10 is generally indicated by the numeral 25 and includes an adapter assembly 26. The adapter assembly provides a body 27 having an upper substantially cylindrical chamber 28 opening outwardly of the body and communicating with the atmosphere through a port 29 in the body. The body also has an annular seat 32 circumscribing the chamber and a socket 33 substantially concentrically downwardly extended from the chamber. Also, with particular reference to FIGS. 3 and 4, the body provides an elongated bore 35 extended transversely of the chamber in slightly offset relation to the socket although in fluid communication therewith through an opening 36, as indicated in FIG. 4. The bore provides opposite ends opening outwardly of the body.

A tubular pressure seal housing 40 provides an enlarged annular shoulder 41 fitted downwardly in the socket 33. The shoulder has an annular groove 42 in which is received an O-ring 43 in fluid sealing engagement with the socket and the shoulder 41. The housing extends substantially concentrically upwardly within the upper chamber 28 and terminates below the annular seat 32. A retaining ring 44 is fitted in the socket and is in engagement with the upper surface of the shoulder for holding the housing in the socket.

An elongated tube 50 is fitted in the bore 35 and rigidly held in place by means of a pin 51. The tube extends outwardly of the bore, and a tube coupling 52 is rotatably connected to the extended end of the tube. The tube has a window 53 in registration with the opening 36 whereby the socket 33 is in fluid communication with the tube. The coupling has internal screw-threads whereby the coupling is screw-threadably connected to the bushing 17 of the fluid flow meter 10. The body 27 provides grooves 54 circumscribing the tube, and O-rings 55 are fitted in these grooves in circumscribing seal engagement with the tube. Also, an O-ring 56 is interposed the bushing and the tube within the coupling. The body provides a circular face plate 58 fitted in the lateral extension 15 of the flow meter when the coupling is tightly connected to the bushing. It is, therefore, evident that the tube provides a lower chamber 60 therein which is in fluid communication with the meter by way of a leakage path from internally of the meter housing 11 and between the bushing and the drive shaft 18 into the lower chamber.

End and center or intermediate bearings 65 and 66 are rigidly axially fitted in axially spaced relation within the tube 50, and a tube block 67 is positioned back of the end bearing and held in position by means of a retaining ring 68. An O-ring 69 is provided between the tube block and the tube adjacent to the end bearing.

An elongated worm shaft 75 is coaxially journaled partially by means of the end and center bearings 65 and 66 within the tube 50. A female coupling 76 is connected to the end of the worm shaft adjacent to the coupling 52 and this female coupling is connected to the male coupling 19 of the drive shaft 18 whereby rotation is imparted to the worm shaft incident to rotation of the drive shaft. A worm 78 is mounted on the worm shaft between the end and center bearings and secured to the shaft by means of a pin 79. It is to be noted that the worm laterally extends partially into the socket 33 through the registering opening 36 and window 53 connecting the socket to the bore 35, all as best seen in FIG. 4.

With particular reference to FIG. 4, a roller thrust bearing 85 is fitted within the shoulder 41 of the housing 40 and a washer 86 is interposed the bearing and the housing. An elongated upwardly disposed register shaft 87 is rotatably journaled in the bearing and provides an upper coupling end 88 extended above the housing 40 and a lower mounted end 89 rotatably journaled within a bore in the body 27 downwardly from the socket 33. A worm gear 90 is secured to the register shaft below the bearing and is in mesh with the worm 78 so that the register shaft is also rotated upon rotation of the drive shaft 18. A fluid seal is interposed the housing 40 and the register shaft 87 and is generally indicated by the numeral 95. Generally stated, the fluid seal is in circumscribing relation to the register shaft, is in fluid-tight engagement with the housing and receives the register shaft in rotatable fluid-tight relation. Specifically, the fluid seal includes an upper retaining ring 96 fitted in a groove in the housing, an upper back-up bearing 97 engaging the retaining ring, a stack of annular chevron rings 98 which are of inverted V-shape in diametric cross section and preferably of Teflon, a lower male pressure ring 99 fitted upwardly against the lowermost chevron ring, a lower washer 100, and an upper pressure ring 101 preferably of Buna-N. A coiled compression spring 103 circumscribes the register shaft 87 and has opposite ends bearing against the washer 100 and the washer 86. The seal just described is known and is suited for precluding the passage of oil upwardly therepast but is not suited to the effective blocking of salt water or other fluids of small molecular composition.

A register box 110 is positioned in the seat 32 and houses a driven gear 111 connected to the register drive shaft 87. The register box is secured to the body 27 by means of bolts 112. Inasmuch as the details of the register box do not form an essential part of the present invention, they are not described in further detail. Suffice it to note, however, that the box provides an upper, preferably glass, face plate 113 through which the register indicator is visible for observing the quantity of fluid passing through the flow meter 10.

The subject invention provides an annular floating bearing or piston 120 of metal, plastic, or other suitable material in slidable circumscribing engagement with the worm shaft 75 in axially spaced relation to the center bearing 66 and in slidable engagement with the tube 50. The bearing has a forward inner pocket 121 circumscribing the shaft and a rear outer groove 122 adjacent to the tube. Forward and rear O-rings 123 and 124, respectively, are fitted in the forward pocket and rear groove in slidable engagement with the worm shaft and the tube. Also, a sealing fluid 128, preferably petroleum oil or other fluid of large molecular composition, substantially fills the lower chamber 60 between the bearing 120 and the fluid seal 95. Also, this same sealing fluid is placed in the upper chamber 28 so that its upper level is below the upper end of the housing 40. By so doing, it blocks ingress of moisture and other impurities to the chamber 28 while equalizing the pressure in the chamber with atmospheric pressure.

It is also to be noted that the housing 40, the socket 33 and the tube 50 including the coupling 52 constitute a conduit in fluid communication with the meter and that the worm shaft 75 and the shaft 87 constitute a drive linkage or shaft means coupling the meter shaft 18 and the driven gear 111 of the register box 110. Considered in this manner, the fluid seal 95 circumscribes the drive linkage or shaft means in fluid sealing relation between such linkage or shaft means and the conduit and in spaced relation to the bearing 120.

An inverted, frusto-conical, fluid-impervious shield 130 is positioned in circumscribing relation to the housing 40 and has an annular flange 131 rested on the seat 32 and an open lower or apical end 132 immersed in the sealing fluid 128 about the housing. The register box 110 releasably clamps the shield in the described position.

*Operation*

The operation of the described embodiment of the subject invention is believed to be readily apparent and is briefly summarized at this point.

In describing the operation of the subject invention, it is assumed that the flow meter 10 is handling operating fluids such as petroleum 135 which contain impurities such as salt water in varying amounts. Accordingly, salt water may be present in the tube 50 on the opposite side of the bearing 120 from the sealing fluid 128. Also, it is to be noted that the petroleum in the meter 10, and thus the leakage of the operating fluid 135 from the meter against the bearing 120, may be under pressures in the order of five thousand pounds per square inch.

Accordingly, as such operating fluid 135 passes through the meter 10, the drive shaft 18 is rotated and imparts rotation to the worm shaft 75, and the register shaft 87, and in this manner drives the gear 111 connected in the register box 110. The operating fluid 135, which in the present environment has been described as petroleum, exerts pressure on the floating bearing 120 causing it to slide axially of the worm shaft 75 toward the center bearing 66 until the pressures on opposite sides of the floating bearing are equalized. Obviously, virtually no movement occurs when oil or like sealing fluid substantially fills the chamber 60. Being freely slidable, the bearing 120 assures equalized fluid pressures at all times on opposite sides thereof. In the event of slight leakage of sealing fluid upwardly along the shaft 87, the bearing 120 accommodates itself thereto by movement to the left, as viewed in FIG. 3. As mentioned, such leakage is negligible and occurs only in very minute amounts over long periods of time. If the cumulative leakage is sufficient to raise the level of the sealing fluid in the chamber 28 to the level of the port 29, the excess fluid is simply discharged through the port and no harm done to the registering mechanism. On the other hand with the shield 130 immersed in the fluid 128 in the upper chamber 28, the registering mechanism is isolated from the atmosphere. In this manner said mechanism is protected from air and moisture thereby preventing steaming and clouding of the face plate 113 and rusting of the other parts of such mechanism.

Inasmuch as the fluid pressures on opposite sides of the floating bearing 120 are always equal, the O-ring seals 123 and 124 shown are adequate in even precluding the passage of salt water into the sealing fluid. In this manner the fluid seal 95 and the other working parts of the register 25 are protected and isolated from the operating fluid in the flow meter 10. Thus, for the first time it has been possible to isolate chambers, such as that shown at 28, from salt water, and other fluids of small molecular structure, even though the pressure differential between the chamber and such salt water or other fluid of small molecular composition is great.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a body member having a first chamber providing an end subject to a fluid under high pressure, a second chamber in communication with the first chamber from which it is desired to exclude said fluid and being exposed to atmospheric pressure, and rotatable shaft means extended from said end of the first chamber into the second chamber; a system for sealing said fluid from the second chamber comprising a bearing slidably fitted about the shaft means and to the first chamber for movement toward and from said end of the first chamber, seal means engaging the bearing and providing respective seals between the bearing and the first chamber and between the bearing and the shaft means, a seal mounted between the first chamber and the second chamber having the shaft means journaled therein and characterized by an ability to withstand fluids of large molecular composition under pressure without appreciable leakage, and a fluid substantially filling the first chamber between the bearing and the seal between the chambers, the fluid in said first chamber and at one side of the bearing being of a molecular composition substantially larger than the molecular composition of the fluid under high pressure at said end of the first chamber.

2. In combination with a fluid meter for conducting fluids discharged from oil wells, which fluids include oil, salt water and the like, the meter providing a rotary drive shaft adapted to be rotated upon passage of fluid through the meter, and a register for indicating the quantity of fluid passing through the meter and providing a rotary driven shaft; an elongated, rotary drive linkage having opposite ends respectively connected to said drive and driven shafts, a tubular conduit circumscribing the linkage in circumferentially spaced relation thereto and being connected in fluid communication with the meter adjacent to the connection between the drive shaft and the linkage, a fluid seal fitted to the conduit about the linkage adjacent to the connection of the driven shaft and the linkage and in sealing engagement with the linkage and the conduit, said seal being capable of withstanding fluid of complex molecular composition under pressure without leakage, a floating bearing circumscribing the linkage within the conduit in longitudinally slidably fitted engagement with the linkage and the conduit, an outer seal circumscribing the bearing and being in slidable sealing engagement with and between the conduit and the bearing, an inner seal circumscribing the linkage and being in slidable sealing engagement with and between the linkage and the bearing, and a sealing fluid of larger molecular composition than salt water substantially filling the conduit between the bearing and the fluid seal whereby pressures are equalized on opposite sides of the bearing and the fluid seal is effectively isolated from the fluids in the meter.

3. In an apparatus for coupling a fluid meter having a rotary drive shaft adapted to be rotated upon passage of fluid through the meter, and a register for indicating the quantity of fluid passing through the meter and having a rotary driven shaft; a body connected to the register and providing a chamber communicating with the register, the body including a fluid conduit extended into the chamber interconnecting the chamber and the fluid meter, the body providing a port opening from the chamber to the atmosphere; a drive linkage extended through the conduit and interconnecting the drive and driven shafts; fluid sealing means in the conduit between the body and the linkage; a sealing fluid in the chamber; and an annular shield in spaced circumscribing relation to the driven shaft and to the conduit and having an open extended end immersed in the fluid in the chamber and an opposite end connected in fluid-tight relation to the body on the opposite side of the port from said extended end whereby the shield and the fluid isolate said port from the register.

4. The apparatus of claim 3 wherein the shield is frusto-conical and wherein the extended and opposite ends of the shield are respectively of minimum and maximum diameter.

5. In a fluid system including a fluid conduit having a coupling portion adapted for connection to a source of fluid under pressure, a rotary drive linkage rotatably journaled in the conduit with the conduit in circumferentially spaced relation to the linkage, and a fluid seal fitted within the conduit and rotatably receiving the linkage, said fluid seal being in spaced relation to the coupling portion and in sealing engagement with the conduit and the linkage; a fluid sealing system comprising a bearing circumscribing the linkage and in slidably fitted engagement with the linkage and the conduit between the seal and the coupling portion for slidable movement longitudinally of the conduit and the linkage, an O-ring positioned between the conduit and the bearing to effect slidable sealing relationship therebetween, an O-ring positioned between the bearing and the linkage to effect slidable sealing relationship therebetween, and a sealing fluid substantially filling the conduit between the seal and the bearing, said sealing fluid being of a viscosity greater than said pressure fluid.

6. In combination with an elongated shaft linkage having a driven end subjected to fluid of relatively small molecular size under high pressure and an opposite drive end exposed to relatively low pressure, said linkage being movable incident to the action of the fluid on said driven end whereby to move said driven end; a system for isolating the drive end of the linkage from said fluid comprising elongated duct means having an open inner end subjected to said high pressure fluid and an opposite outer end open to said low pressure, means movably mounting the linkage in the duct means with the duct means in circumscribing, circumferentially spaced relation to the linkage, and with the driven and drive ends, at the inner and outer ends, respectively, of the duct means, a floating bearing longitudinally slidably mounted on the linkage within and in slidable engagement with the duct means adjacent to the inner end thereof for reciprocal movement longitudinally of the shaft having an end disposed toward said inner end and exposed to said fluid under pressure and an opposite end disposed toward the outer end of the duct means, fluid seals positioned between the shaft linkage and the bearing and between the bearing and the surrounding duct means, sealing means mounted about the drive end of the shaft linkage in sealing engagement with the duct means, said sealing means movably engaging the drive end of the linkage in fluid-tight relation, said sealing means having an outer end disposed toward said relatively low pressure, and an inner end in spaced relation to said opposite end of the bearing and constituting an effective barrier to fluids of large molecular size, and a fluid of large molecular size substantially filling the duct means between the bearing and the sealing means.

7. A fluid sealing system for use about a rotating shaft linkage subjected at one end to a fluid of high penetrability under high pressure and an opposite end subjected to atmospheric pressure comprising a body member having a passage communicating with said fluid of high penetrability under pressure, and a chamber open to the atmospheric pressure in communication with the passage; means journaling the shaft linkage in the passage with the linkage extended from said fluid under pressure into the chamber; a piston slidably mounted on the shaft linkage within the passage for reciprocable engagement with the body member about the pasage for reciprocal movement longitudinally of the shaft having an end exposed to said fluid under pressure and an opposite end; fluid seals positioned between the shaft linkage and the piston and between the piston and the surrounding body member; sealing means mounted about the shaft linkage in fixed engagement with the body member, said sealing means having an outer end disposed toward the chamber subject to atmospheric pressure, an inner end in spaced relation to said opposite end of the piston and constituting an effective barrier to fluids of large molecular size; and a fluid of large molecular size substantially filling the passage between the piston and the sealing means, whereby said sealing system constitutes an effective barrier against a fluid of relatively small molecular size.

8. The combination of claim 7 wherein the sealing means includes a stack of Teflon chevron rings in circumscribing sealing engagement with said linkage, and wherein means are provided against opposite endmost chevron rings for holding the chevron rings in predetermined longitudinal position on the linkage.

9. The combination of claim 8 wherein said holding means includes an annular chevron pressure ring of Buna-N against the outermost Teflon ring, an inner pressure ring against said innermost Teflon ring, and resilient means yieldably urging the inner pressure ring against the stack of rings.

10. In combination, a fluid drive mechanism adapted to conduct fluid of relatively small molecular size under high pressure considerably in excess of atmospheric pressure, the mechanism having an outwardly extended tubular bushing, a drive shaft extended through and journaled in the bushing and adapted to be rotated incident to passage of such fluid through the mechanism, the bushing and the shaft defining a leakage path therebetween having an inner opening subjected to such fluid under pressure and an opposite outer opening; a driven mechanism; and a system for connecting the drive mechanism to the driven mechanism while isolating the driven mechanism from fluid in the drive mechanism comprising an elongated fluid conductor connected in fluid-tight relation to the outer end of the bushing in circumscribing, circumferentially spaced relation to the shaft and to the outer opening of said path, the conductor having an outer end outwardly extended from the shaft, stationary bearings securely fitted in the outer end of the conductor in spaced relation to each other, an elongated shaft linkage concentrically extended in circumferentially spaced relation to and through the conductor having an outer end portion rotatably journaled in the bearings and connected to the driven mechanism and an inner end coupled to the drive shaft adjacent to the bushing, an annular floating bearing longitudinally slidably circumscribing the linkage and longitudinally slidably circumferentially engaging the conductor between the stationary bearings and the bushing, an outer O-ring interposed the floating bearing in the conductor in circumscribing sealing engagement with the floating bearing and in slidable sealing engagement with the conductor, an inner O-ring interposed the floating bearing and the linkage in circumscribing sealing engagement with the linkage and in slidable sealing engagement with the floating bearing, said O-rings constituting effective barriers to fluids of relatively larger molecular size, an elongated fluid seal circumscribing the outer end portion of the linkage and being in fluid sealing engagement between and with the linkage and the conductor, the linkage being rotatable within said fluid seal and said seal constituting an effective barrier against fluid of large molecular size, and a fluid of said large molecular size substantially filling the conductor between said seal and the floating bearing whereby fluid under high pressure in the drive mechanism leaking through said leakage path against one side of the floating bearing is equalized by said fluid of large molecular size on the other side of the floating bearing, whereby said O-rings in cooperation with said fluid of large molecular size constitute a barrier to fluids of such relatively smaller molecular size, and whereby said driven mechanism is isolated from fluid in the drive mechanism by said O-rings, the fluid of larger molecular size, and the fluid seal.

11. In combination, a fluid meter adapted to conduct fluid of relatively small molecular size under high pressure considerably in excess of atmospheric pressure, the meter having an outwardly extended tubular bushing, a drive shaft extended through and journaled in the bushing and adapted to be rotated incident to passage of such fluid through the meter, the bushing and the shaft defining a leakage path therebetween having an inner opening subjected to such fluid under pressure and an opposite outer opening; an elongated tube connected in fluid-tight relation to the outer end of the bushing in circumscribing, circumferentially spaced relation to the shaft and to the outer opening of said path, the tube having an outer end coaxially outwardly extended from the shaft and having a window in its outer end portion; a plug fitted in fluid-tight engagement in the outer end of the tube with said window being between the plug and the bushing; outer and intermediate bearings securely fitted in the outer end of the tube in spaced relation to each other with the window therebetween; and an elongated worm shaft concentrically extended in circumferentially spaced relation to and through the tube having an outer end portion journaled in the bearings and an inner end coupled to the drive shaft adjacent to the bushing; a worm secured to the worm shaft between the bearings in opposed relation to said window; an annular floating bearing longitudinally slidably circumscribing the worm shaft and longitudinally slidably circumferentially engaging the tube between the intermediate bearing and the bushing; an outer O-ring interposed the floating bearing in the tube in circumscribing sealing engagement with the floating bearing and in slidable sealing engagement with the tube; an inner O-ring interposed the floating bearing and the worm shaft in circumscribing sealing engagement with the worm shaft and in slidable sealing engagement with the floating bearing, said O-rings constituting effective barriers to fluids of relatively larger molecular size; a body having a bore receiving the tube therein, a socket opening into the tube through said window and upwardly extended therefrom about an upright axis, and a chamber larger than and upwardly extended through the socket and being substantially atmospheric pressure; an elongated tubular seal housing coaxially fitted in fluid-tight relation in the socket and upwardly extended therefrom into the chamber; a register shaft concentrically journaled in the housing having an upper end extended above the housing and a lower end extended into the socket; a worm gear secured to the register shaft and being in mesh with the worm through said window; an elongated fluid seal circumscribing the register shaft and being in fluid sealing engagement with the register shaft and the housing, the register shaft being rotatable within said fluid seal and said seal constituting an effective barrier against fluid of large molecular size; and a fluid of said large molecular size substantially filling the tube and socket between said seal and the floating bearing whereby fluid under high pressure in the meter leaking through said leakage path against one side of the floating bearing is equalized by said fluid of large molecular size on the other side of the floating bearing, whereby said O-rings in cooperation with said fluid of large molecular size constitute a barrier to fluids of such relatively smaller molecular size, and whereby said register shaft is isolated from fluid in the meter by said O-rings, the fluid of larger molecular size, and the fluid seal.

12. In a fluid system including a fluid conduit having a coupling portion adapted for connection to a source of fluid under pressure, a rotary drive linkage rotatably journaled in the conduit with the conduit in circumferentially spaced relation to the linkage, and a fluid seal fitted within the conduit and rotatably receiving the linkage, said fluid seal being in spaced relation to the coupling portion and in sealing engagement with the conduit and the linkage; a fluid sealing system comprising a bearing circumscribing the linkage and in slidably fitted engagement with the linkage and the conduit between the seal and the coupling portion for adjustable movement longitudinally of the conduit and the linkage, an O-ring positioned between the conduit and the bearing to effect slidable sealing relationship therebetween, an O-ring positioned between the bearing and the linkage to effect slidable sealing relationship therebetween, and a sealing fluid substantially filling the conduit between the seal and the bearing, said sealing fluid being of larger molecular composition than the fluid from said source whereby the fluid seal itself is capable of acting as an effective barrier against leakage therepast of fluid of larger molecular composition under pressure but is relatively ineffective as a barrier for the fluid of smaller molecular composition, and whereby the O-rings in conjunction with said sealing fluid are capable of acting as effective barriers against leakage therepast of fluid of smaller molecular compositions under pressure than said fluids of larger molecular composition.

13. The system of claim 12 wherein the fluid from the source includes salt water and the sealing fluid is oil.

14. A fluid sealing system for use about a rotating shaft linkage subjected at one end to a first fluid having predetermined penetrability characteristics under a first pressure greater than atmospheric and an opposite end subjected to a second pressure less than said predetermined pressure comprising a body member having a passage communicating with said first fluid under pressure, and a chamber open to the second pressure in communication with the passage; means journaling the shaft linkage in the passage with the linkage extended from said first fluid into the chamber; a piston slidably mounted on the shaft linkage within the passage in slidable engagement with the body member about the passage for reciprocal movement longitudinally of the shaft having an end exposed to said first fluid and an opposite end; fluid seals positioned between the shaft linkage and the piston and between the piston and the surrounding body member, said seals constituting an effective barrier against fluids of relatively less penetrability than said first fluid but being subject to leakage of said first fluid of higher penetrability; sealing means mounted about the shaft linkage in fixed engagement with the body member, said sealing means having an outer end disposed toward the chamber subject to the second pressure and an inner end in spaced relation to said opposite end of the piston; and a fluid of a predetermined value of penetrability less than said first fluid substantially filling the passage between the piston and the sealing means and, in conjunction with said sealing means, constituting an effective barrier to said first fluid.

15. In combination with an elongated shaft linkage having a driven end subjected to a first fluid of a predetermined value of penetrability under a first pressure and an opposite drive end exposed to relatively lower pressure; a system for isolating the drive end of the linkage from said first fluid comprising elongated duct means having an open inner end subjected to said first pressure and an opposite outer end open to said lower pressure, means movably mounting the linkage in the duct means with the duct means in circumscribing, circumferentially spaced relation to the linkage, and with the driven and drive ends at the inner and outer ends, respectively, of the duct means, a floating bearing longitudinally slidably mounted on the linkage within and in slidable engagement with the duct means adjacent to the inner end thereof for reciprocal movement longitudinally of the shaft having an end disposed toward said inner end and exposed to said first fluid under high pressure and an opposite end disposed toward the outer end of the duct means, fluid seals positioned between the shaft linkage and the bearing and between the bearing and the surrounding duct means, sealing means mounted about the drive end of the shaft linkage in sealing engagement with the duct means, said sealing means movably engaging the drive end of the linkage in fluid-tight relation, said sealing means having an outer end disposed toward said relatively lower pressure, and an inner end in spaced relation to said opposite end of the bearing and constituting an effective barrier to fluids of a penetrability less than said first fluid, and a second fluid of a penetrability less than said first fluid, substantially filling the duct means between the bearing and the sealing means.

References Cited in the file of this patent

UNITED STATES PATENTS

| | | |
|---|---|---|
| 954,621 | Gamon | Apr. 12, 1910 |
| 1,681,075 | Wiegert | Aug. 14, 1928 |
| 1,828,093 | Ailman | Oct. 20, 1931 |
| 2,730,386 | Shields | Jan. 10, 1956 |
| 2,738,775 | Smyser | Mar. 30, 1956 |
| 2,898,867 | Saalfrank | Aug. 11, 1959 |

FOREIGN PATENTS

| | | |
|---|---|---|
| 522,272 | Italy | Mar. 31, 1955 |